T. F. JONES.
Cultivator Plow.
No. 109,629.
Patented Nov. 29, 1870.
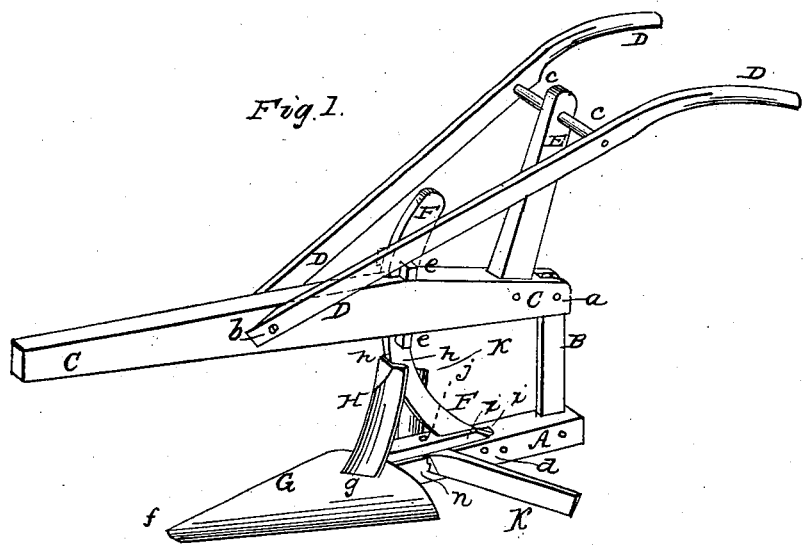
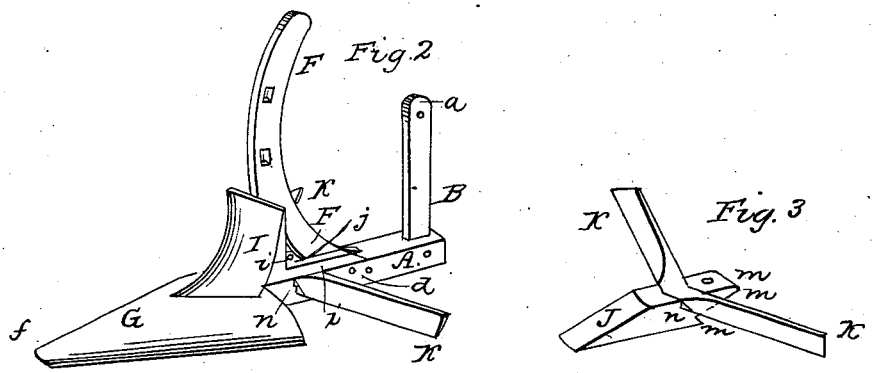
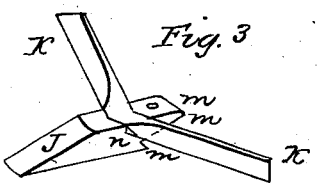
WITNESSES
Henry N. Hyatt
Edmund Masson
INVENTOR
Thomas F. Jones
By atty A.B. Stoughton

UNITED STATES PATENT OFFICE.

THOMAS F. JONES, OF HICKSFORD, VIRGINIA.

IMPROVEMENT IN CULTIVATOR-PLOWS.

Specification forming part of Letters Patent No. 109,629, dated November 29, 1870.

*To all whom it may concern:*

Be it known that I, THOMAS F. JONES, of Hicksford, in the county of Greenville and State of Virginia, have invented certain new and useful Improvements in Cultivator-Plows; and I do hereby declare that the following is a full, clear, and exact description of the construction and operation of the same, reference being had to the accompanying drawings, making a part of this specification, in which—

Figure 1 represents a perspective view of the cultivator-plow in one of its forms. Fig. 2 represents in perspective a modification thereof. Fig. 3 represents in perspective another modification.

Similar letters of reference, where they occur in the separate figures, denote like parts of the plow in all of them.

My invention relates to a cultivator-plow for cultivating plants in rows—such as cotton, corn, or potatoes—and for smoothing down the soil; and it consists in the devices for regulating the plow and wings to the proper height for the plants to be cultivated by it.

To enable others skilled in the art to make and use my invention, I will proceed to describe the same with reference to the drawings.

A represents a stock or base-piece, to the rear portion of which an upright, B, is united, and to the top of this upright the beam C is pivoted or hinged, as at $a$. The handles D are bolted to the beam at $b$, and are further supported near their upper ends by a rung, $c$, passing through a brace, E, rising from near the rear end of the beam C. To the stock or base-piece A is fastened, as at $d$, a curved arc, F, which passes up through the beam, on which the beam can be adjusted, and, when adjusted, firmly held by the keys $e\ e$, one on each side of the beam. On the front end of the stock or base-piece A is fastened a point or plow, G, and which, as shown in Figs. 1 and 2, widens out as it extends rearward from its point $f$, and also rises and is arched, so as to readily enter the soil, raise it up slightly, and allow it to pass off at both sides of the line of its progression. Behind the point or plow G is a share mold-board, H, its lower end, $g$, resting upon the crown of the plow G, and its upper end, $h$, stopped or recessed to brace into or against the arc F. On the rear side of the share H is wrought a projection, $i$, which rests upon the stock A, and its rear end is slotted so as to straddle the arc F, and is bolted to said stock at $j$. This makes the share very firm and rigid, and yet admits of its easy removal when not required, or when a mold-board such as that shown at I, Fig. 2, may be preferred or required, which turns the soil to one side only and to such distance as may be desired by extending it more or less toward that side in the making of it.

Fig. 3 represents a point only, as at J, which may in some cases be used instead of the plow G, and which is shouldered or recessed, as at $m$, so as to fit onto or against counter shoulders or recesses on the sole or stock A, the plow G being similarly shaped, so as to fit against the said shoulders on said stock, to admit of the transposition of one point for another of a different shape.

The wings K, of knife-blade form, are secured in a recess, $n$, in the stock, and are arranged behind the colter, mold-board, plow, or point, and thus, following the cultivating device, scrape or cut off and level down all protuberances, leaving the ground flat and even.

What I claim is—

The arrangement of the stock A, carrying the arc F, and the plow or point and wings K, with a hinged and adjustable beam, C, all being arranged as and for the purpose herein described and represented.

THOMAS F. JONES.

Witnesses:
A. B. STOUGHTON,
EDMUND MASSON.